Jan. 12, 1932.  E. B. G. LEFEVRE ET AL  1,840,907
DOOR BUMPER
Filed Sept. 8, 1930
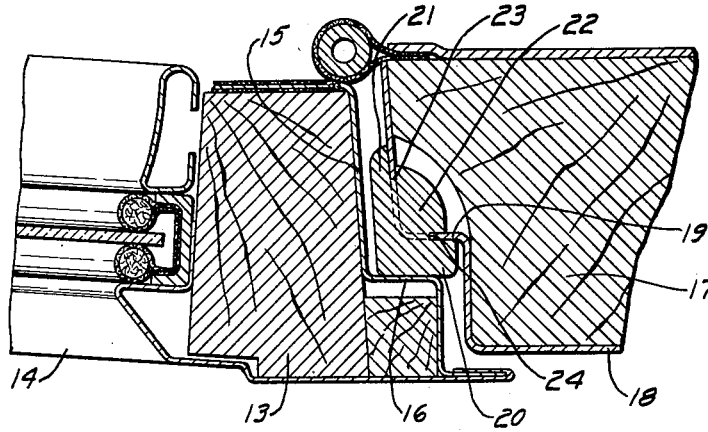
Fig. 2
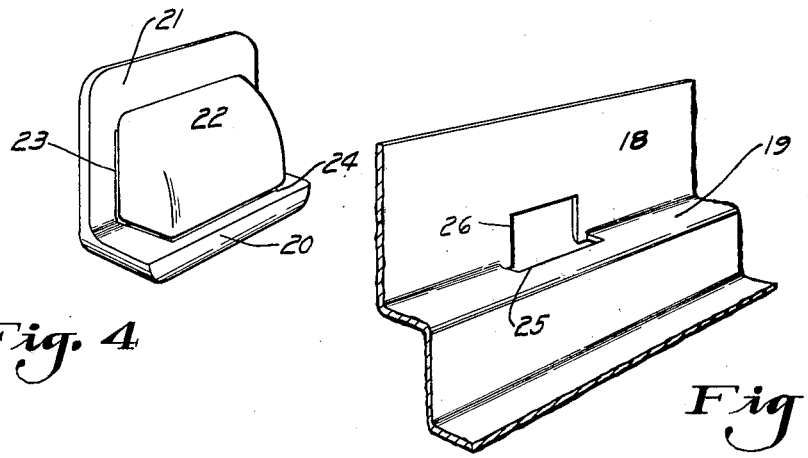
Fig. 4
Fig. 3
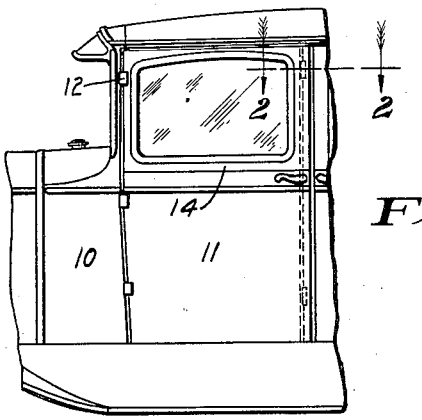
Fig. 1
INVENTOR.
E. B. G. Lefevre.
BY A. P. Fletcher.
E. H. Davis
ATTORNEY.
Witness.
E. C. McRae.

Patented Jan. 12, 1932

1,840,907

UNITED STATES PATENT OFFICE

EMIL B. G. LEFEVRE, OF DETROIT, AND ARTHUR P. FLETCHER, OF HUNTINGTON WOODS, MICHIGAN, ASSIGNORS TO FORD MOTOR COMPANY, OF DEARBORN, MICHIGAN, A CORPORATION OF DELAWARE

DOOR BUMPER

Application filed September 8, 1930. Serial No. 480,294.

The object of our invention is to provide a door bumper of simple, durable and inexpensive construction.

A further object of our invention is to provide a door bumper especially adapted for use in connection with automobile doors.

Our improved door bumper is primarily designed to be fastened to an automobile body in such position that the adjacent door pillar will slam against it when the door is being closed. The device is formed of rubber and is of such resiliency that the impact of the door is absorbed with very little noise.

Still a further object of our invention is to provide a door bumper which may be conveniently and quickly assembled in place without the use of screws, clamps, or the like. The ordinary rubber door bumper requires screws to fasten it to the door pillar and also metal washers or plates imbedded in the bumper to form a bearing for these screws. Our device, eliminating these parts, is consequently more desirable.

With these and other objects in view our invention consists in the arrangement, construction and combination of the various parts of our improved device as described in the specifications, claimed in our claims, and illustrated in the accompanying drawings, in which:

Figure 1 shows a side elevation of an automobile body having our improved door bumper installed thereon.

Figure 2 shows a sectional view taken on the line 2—2 of Figure 1.

Figure 3 shows a perspective view of the metal door pillar covering, showing in particular the opening which is stamped therein to receive our improved bumper, and Figure 4 shows a perspective view of our improved bumper before being assembled to the door pillar.

Referring to the accompanying drawings, we have used the reference numeral 10 to indicate generally the body of an automobile having a door 11 hinged at 12 thereto. The door member 11 is composed of a pair of spaced vertical pillars 13 over which an outside door panel 14 is secured. The vertical edges of this panel are crimped over the outer edges of vertical strips 15 which encase the edges and inner faces of the door pillars 13. The strip 15, forming the free edge of the door, is provided with an offset portion 16 which extends vertically the full height of the door. This offset forms a stop which co-acts with our door bumper when the door is closed.

The body 10 is provided wtih vertical uprights or door posts 17 forming the frame for the door 11. A metallic cover 18 is fastened over these posts 17, which covering is offset at 19 to interlock with the offset 16 of the door. Thus when the door is closed the portion 16 tends to shut against the portion 19. Our improved bumper is disposed between these two offsets 16 and 19 to thereby resiliently absorb the impact of closing the door.

Our door bumper consists of a resilient moulded rubber member of a substantially angle section adapted to fit over the corner of the offset 19, one flange 20 of the bumper bearing against this offset and the other flange 21 bearing against the member 18 at right angles thereto. A web 22 is formed between these flanges of such size that a flat portion on the inside of each flange is left, which flat portion extends around the peripheries of the flanges. This is readily accomplished by proportioning the web so that its co-acting surfaces with the flanges are somewhat smaller than the flanges. By this construction the flanges are supported at right angles to each other and further, a load impressed on one of the flanges will be distributed to the other flange over a wide area.

A groove 23 is provided around the coacting surface of the web and the flange 21 and a similar groove 24 is provided between the web and the flange 20. These grooves secure the bumper to the covering 18 without other means, such as screws or the like.

A rectangular opening 25 is stamped into the offset 19 at the corner thereof, this opening being of a length corresponding to the thickness of the web 22. The width of this opening, however, is only the equivalent of the distance from the bottom of the groove 24 to the flange 21. A similar opening 26 is provided in the adjacent portion of the covering 18, the size of this opening being the same as the co-acting surface of the web 22 and flange 21, measured, of course, at the bottom of the groove 23.

To assemble our improved bumper the web 22 is inserted through the opening 25, the sides of the opening 26 running in the grooves 23. The bumper will readily move in this direction until the portion forming the end of the opening 25 strikes against the outer edge of the web at which time a sharp blow on the flange 20 will compress the web and allow this end portion to enter the groove 24. The end of the opening 26 will then be forced into the groove 23 thereby preventing the accidental removal of the bumper holding the flanges 20 and 21 into intimate contact with the offset 19 and adjacent portion of the member 18.

The impact load received on the flange 20 when the door closes is partly absorbed by the periphery of the flange. which bears against the offset 19, that part of the impact load striking the center part of the flange being transferred by the web 22 to the edges of the opening 26. It will readily be seen that an impact on the flange 21 will likewise be absorbed in the adjacent edges of the openings 26 and 25. A much better support is thus provided for our bumper than is provided in the ordinary structure.

Among the many advantages arising from the use of our improved device, it may be well to mention that we have provided a bumper which may be assembled without the use of screws, rivets, or the like.

Further, if after the hinges on the car doors become somewhat loose and side play developes between the door and the frame, our improved bumper will act in a direction transverse to the direction of the normal impact loads thereby preventing rattle between the door and frame.

Still further, our device being made from a single moulded rubber member, is much cheaper than the ordinary bumper, and when taken in conjunction with the simplicity of assembling the device forms a combination having a material commercial advantage over other types of door bumpers.

Some changes may be made in the arrangement, construction and combination of the various parts of our improved device without departing from the spirit of our invention, and it is our intention to cover by our claims such changes as may reasonably be included within the scope thereof.

We claim as our invention:

1. A door bumper consisting of an L shaped member of resilient rubber having a resilient web formed integrally therewith connecting the adjacent arms of said member, said web having a groove therein extending around the periphery of the area of contact between the web and member whereby the bumper may be resiliently secured over the corner of an L shaped piece of sheet metal to thus absorb loads from more than one direction, the load in either direction tending to shear said area of contact lying in the plane thereof.

2. A door bumper consisting of a right angle shaped member of resilient rubber having a resilient web formed integrally therewith connecting the adjacent sides of said angle, said web having a groove extending around the periphery of the area of contact, between the web and member whereby the bumper may be resiliently secured over the corner of a right angle-shaped piece of sheet metal to thus absorb loads in the planes of both arms of said angle, the load in either direction tending to shear said area of contact in the plane thereof.

3. A door bumper consisting of an L shaped member of resilient rubber having a resilient web formed integrally therewith, connecting the adjacent arms of said member, the area of contact between the web and member being spaced from the three outer edges of each arm comprising said member, whereby impact loads on said bumper will be absorbed by the periphery of said arms, and said web having a groove therein extending around the periphery of said area of contact whereby said bumper may be resiliently secured in a suitable opening formed in an L shaped piece of sheet metal to thus absorb loads from more than one direction.

EMIL B. G. LEFEVRE.
ARTHUR P. FLETCHER.